Figure 1:
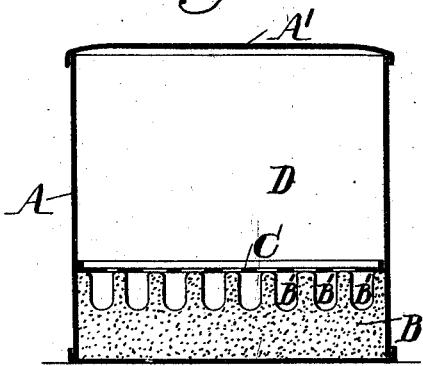

(No Model.)

A. M. PURVES.
DEVICE FOR DRYING AIR.

No. 558,840. Patented Apr. 21, 1896.

WITNESSES:
Henry Drury
Edw. F. Ayres.

INVENTOR:
Austin M. Purves
by his atty.
Francis T. Chambers

UNITED STATES PATENT OFFICE.

AUSTIN M. PURVES, OF PHILADELPHIA, PENNSYLVANIA, ASSIGNOR TO THE PENNSYLVANIA SALT MANUFACTURING COMPANY, OF SAME PLACE.

DEVICE FOR DRYING AIR.

SPECIFICATION forming part of Letters Patent No. 558,840, dated April 21, 1896.

Application filed October 15, 1894. Serial No. 525,885. (No model.)

*To all whom it may concern:*

Be it known that I, AUSTIN M. PURVES, a citizen of the United States, residing in Philadelphia, county of Philadelphia, State of Pennsylvania, have invented a certain new and useful Improvement in Means for Packing Chemicals, of which the following is a true and exact description, reference being had to the accompanying drawings, which form a part thereof.

This invention relates to the packing of chemicals, and has for its object to provide a package of calcium chlorid of such a character that it can be conveniently handled and shipped without access of atmospheric moisture, and which may be used in its original containing vessel to serve its usual purpose as a desiccator, more particularly in confined spaces, such as ice-chests, closets, and the like.

With this object in view I provide a can or box to contain a solid mass or cake of calcium chlorid, and which also is provided with a liquid-collecting chamber, so that this package may be used simultaneously as the container of the desiccating material and the receptacle for the solution formed by the absorption of atmospheric moisture. In order to increase the surface to be exposed to the atmosphere when the package is in actual use as a desiccator, I supply the cake of calcium chlorid with corrugations or perforations. I have illustrated this package in the drawings, in which—

Figure 5:
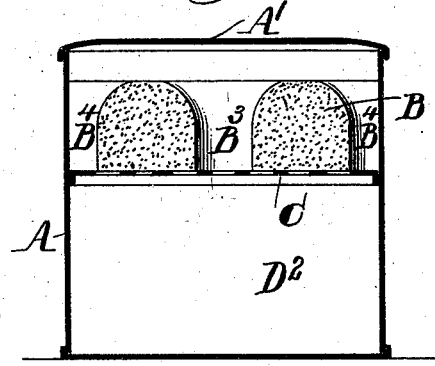
Figure 2:
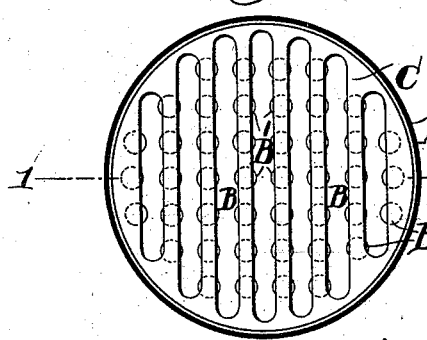
Figure 6:
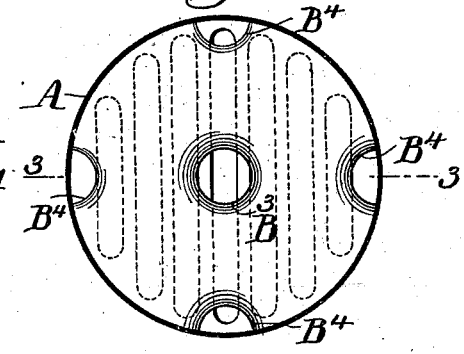
Figure 3:
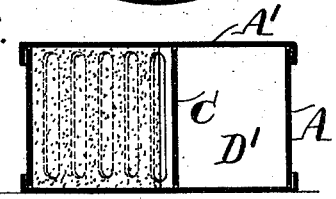
Figure 7:
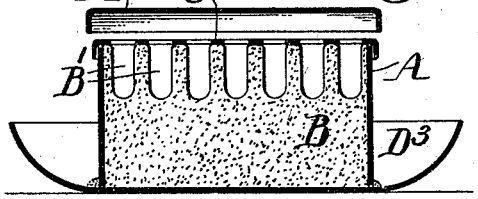
Figure 4:
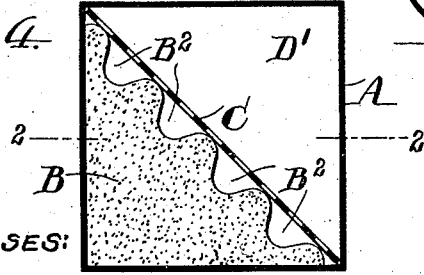

Figure 1 is a sectional view, on line 1 1 of Fig. 2, of a box containing a solid mass or cake of calcium chlorid, and by which the unoccupied space will serve as a liquid-receptacle. Fig. 2 is a plan view of this box with its lid removed. Fig. 3 is a sectional view, on line 2 2 of Fig. 4, of a modified construction. Fig. 4 is a plan view of this box with its lid removed. Fig. 5 is a sectional view, on line 3 3 of Fig. 6, of another modification of my package, Fig. 6 showing the same in plan without its lid; and Fig. 7 illustrates in section still another modification.

Similar letters indicate similar parts throughout the illustrations.

A in each case is a box or can most conveniently made of sheet metal, A' indicating a cover or lid for covering the same, so as to exclude atmospheric moisture.

B indicates a molded cake of calcium chlorid, which may either be cast in the box or the compartment thereof which it is intended to occupy, but which obviously may also be first molded and then placed in the box.

It is evident that the cake of calcium chlorid may be made to assume any desired shape without departing from the spirit of my invention. In the preferred form the cake is provided with corrugations, as $B^2$, or with pits or perforations, as $B'$ $B^3$ $B^4$, for the purpose of increasing its surface, and such a cake, having a relatively great area of exposure, is in itself an important and distinct feature of my invention, as its capacity for being securely packed and transported, and also for acting rapidly as a desiccator, is independent of the containing vessel, which, together with the cake of calcium chlorid, constitutes the package in its complete form.

C indicates a perforated partition so placed and formed as to hold the calcium chlorid in one of the compartments of the can or box, the other compartment serving to receive the solution formed through the absorption of atmospheric moisture.

The liquid-compartment is illustrated in various forms and locations, as at D, D', $D^2$, and $D^3$.

In Fig. 1 the calcium chlorid is located in the bottom of the can A and held in place by a slotted or perforated diaphragm C, the upper portion serving as a receptacle for the liquid formed. This plan of construction is very simple, but has the disadvantage of flooding this cake B with water, whereby the efficiency of a desiccating-cake is much diminished. In Fig. 3 this is avoided in great part by placing the cake upon one side of the box, the partition C being vertically located in the can, so that the liquid of deliquesence will drain into the compartment D'. This construction is simple and efficient, (and is my preferred form of package,) though the construction shown in Fig. 5, in which the water-chamber $D^2$ is below the cake B, is more efficient, although more troublesome to put up. In this last form I prefer to provide the cake with perforations $B^3$ $B^4$, whereby the liquid of deliquesence may pass entirely through the cake into the receptacle D' and be poured off through said perforations by inverting the can.

While I prefer to provide a liquid-receptacle in the same can which contains the cake B, a serviceable package can be made up by providing a receptacle outside of the can containing the calcium chlorid—as, for instance, as shown in Fig. 7, where the receptacle is placed around the outside of the can A.

It will be noticed that the roughened face of the cake B is placed in contact with the perforated partition C, by reason of which construction the air to be desiccated has free access to the roughened surface of the cake.

The special devices shown in Figs. 5 and 6 form the subject-matter of my concurrent application, Serial No. 525,886, of even date herewith, and are not specifically claimed herein, because in a narrow sense they are alternative in character to the device of Fig. 3, which is specifically claimed.

I have specified calcium chlorid as the material of the cake B, because this chemical is cheap and is in no wise dangerous or objectionable. I do not wish, however, to exclude the use of compounds or admixtures of this chemical.

What I claim is—

1. As a new article of manufacture, a desiccating-package consisting of a rectangular box or can having a vertical perforated partition therein extending from one corner diagonally across to the other corner, in combination with a cake of calcium chlorid secured in one of the compartments so formed, as set forth.

2. As a new article of manufacture, a desiccating-package consisting of a rectangular box or can having a vertical perforated partition therein extending from one corner diagonally across to the other corner, in combination with a cake of calcium chlorid secured in one of the compartments so formed, said cake having one or more of its faces corrugated or pitted to increase the area of its exposed surface, as set forth.

AUSTIN M. PURVES.

Witnesses:
H. J. TACK,
EDW. F. AYRES.